(12) United States Patent
Takahara et al.

(10) Patent No.: US 12,480,638 B2
(45) Date of Patent: Nov. 25, 2025

(54) LIGHTING APPARATUS

(71) Applicants: TOYO DENSO KABUSHIKI KAISHA, Tokyo (JP); Honda Access Corp., Niiza (JP)

(72) Inventors: Daiki Takahara, Tsurugashima (JP); Yasuhiro Tamura, Niiza (JP); Ryoichi Enoki, Niiza (JP); Yuta Nakase, Niiza (JP); Zhuqi Hu, Niiza (JP)

(73) Assignees: TOYO DENSO KABUSHIKI KAISHA, Tokyo (JP); Honda Access Corp., Niiza (JP)

( * ) Notice: Subject to any disclaimer, the term of this patent is extended or adjusted under 35 U.S.C. 154(b) by 0 days.

(21) Appl. No.: 19/037,811

(22) Filed: Jan. 27, 2025

(65) Prior Publication Data

US 2025/0243991 A1 Jul. 31, 2025

(30) Foreign Application Priority Data

Jan. 30, 2024 (JP) ................ 2024-011760

(51) Int. Cl.
*F21V 11/00* (2015.01)
*F21W 106/00* (2018.01)
*F21Y 103/30* (2016.01)

(52) U.S. Cl.
CPC .......... *F21V 11/00* (2013.01); *F21V 2200/15* (2015.01); *F21W 2106/00* (2018.01); *F21Y 2103/30* (2016.08)

(58) Field of Classification Search
None
See application file for complete search history.

(56) References Cited

U.S. PATENT DOCUMENTS

| | | | |
|---|---|---|---|
| 2011/0286699 A1* | 11/2011 | Sanada | H04N 1/02835 385/36 |
| 2014/0119043 A1* | 5/2014 | Kodama | B60Q 3/20 362/551 |
| 2018/0252380 A1* | 9/2018 | Kitayama | B60Q 1/0035 |
| 2019/0285242 A1* | 9/2019 | Horikawa | G02B 6/0036 |
| 2019/0379801 A1* | 12/2019 | Matsuzawa | G03B 27/54 |
| 2023/0242180 A1* | 8/2023 | Kojima | B62D 1/04 362/511 |

FOREIGN PATENT DOCUMENTS

JP 6686836 B2 4/2020

* cited by examiner

*Primary Examiner* — Christopher E Dunay
(74) *Attorney, Agent, or Firm* — WHDA, LLP

(57) ABSTRACT

This lighting apparatus includes a linear light guide body that has a first side end into which light from a light source is introduced and a second side end positioned opposite to the first side end, and emits light in a linear shape by propagating the light introduced into the first side end toward the second side end, and a light shielding tube that has a covering portion attached to the linear light guide body to surround at least the second side end of the linear light guide body and a protruding portion integrally connected to the covering portion and protruding from the second side end of the linear light guide body, in which the protruding portion is configured to be able to be bent with respect to the covering portion to cover a second side end surface of the linear light guide body.

10 Claims, 6 Drawing Sheets

LIGHTING APPARATUS

CROSS-REFERENCE TO RELATED APPLICATION

The present application claims priority based on Japanese Patent Application No. 2024-011760, filed Jan. 30, 2024, the content of which is incorporated herein by reference.

BACKGROUND OF THE INVENTION

Field of the Invention

The present invention relates to a lighting apparatus.

Description of Related Art

Vehicle interior panels, such as center consoles and instrument panels, may be equipped with a lighting apparatus that, for example, causes an outer periphery of the interior panel to emit light in a linear shape. As this type of lighting apparatus, a configuration including a linear light guide body that guides light emitted from a light source and a light shielding cap provided at an end (tip) of the light guide body on an opposite side to a light source side is known (refer to, for example, Japanese Patent No. 6686836).

With this configuration, the light introduced from the light source into the light guide body is emitted from an outer circumferential surface of the light guide body during a process of propagating through the light guide body. As a result, the outer periphery of the interior panel is caused to emit light in a linear shape. In addition, the light that propagates through the light guide body to the tip is prevented from being emitted to the outside by the light shielding cap.

SUMMARY OF THE INVENTION

In the lighting apparatus described above, a light shielding tube surrounding the light guide body may be provided to limit the emission range in an extension direction of the light guide body. In this case, the light shielding tube and a light shielding cap are provided separately, which increases the number of parts and increases manufacturing costs.

An aspect of the present invention provides a lighting apparatus that can reduce the number of parts and lower costs.

To achieve the object described above, the lighting apparatus according to the aspect of the present invention adopts the following configuration.

(1): A lighting apparatus according to one aspect of the present invention includes a linear light guide body that has a first side end into which light from a light source is introduced and a second side end positioned opposite to the first side end, and emits light in a linear shape by propagating the light introduced into the first side end toward the second side end, and a light shielding tube that has a covering portion attached to the linear light guide body to surround at least the second side end of the linear light guide body and a protruding portion integrally connected to the covering portion and protruding from the second side end of the linear light guide body, in which the protruding portion is configured to be able to be bent with respect to the covering portion to cover a second side end surface of the linear light guide body.

According to the aspect of (1) described above, light emission from at least the outer circumferential surface of the second side end of the linear light guide body can be suppressed by attaching the covering portion of the light shielding tube to the linear light guide body. As a result, it is possible to adjust an emission range in an extension direction of the linear light guide body.

In addition, the second side end surface of the linear light guide body can be covered by the light shielding tube by bending the protruding portion of the light shielding tube with respect to the covering portion. As a result, it is possible to suppress light leakage from the second side end surface of the linear light guide body. In this case, it is possible to reduce the number of parts and lower costs compared to a conventional configuration in which the second side end surface of the linear light guide body is covered by an end cap separate from the light shielding tube.

According to the aspect of the present invention, it is possible to reduce the number of parts and lower costs.

DESCRIPTION OF EMBODIMENTS

Figure 1:
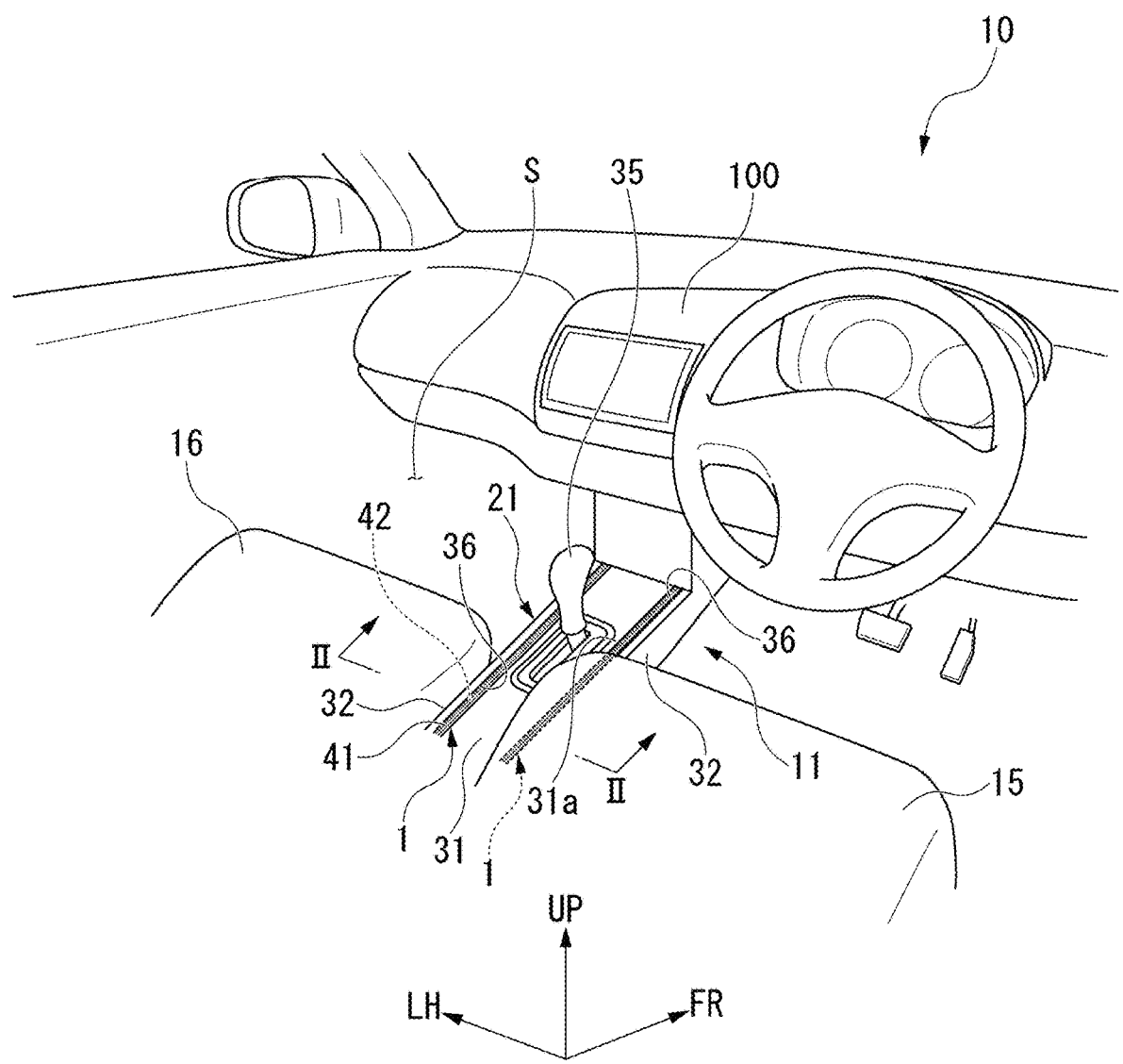
FIG. 1 is a perspective view which shows an interior of a vehicle according to an embodiment.

An embodiment of the present invention will be described with reference to the drawings. In the embodiment and modification described below, the same reference numerals may denote corresponding constituents, and the description may be omitted. In the following description, expressions indicating relative or absolute arrangements, such as "parallel," "orthogonal," "center," and "coaxial" not only indicate such arrangements strictly, but also indicate a state in which there is a relative displacement with an angle or distance to an extent that allows a tolerance or the same function to be obtained. In addition, in the present embodiment, "facing" does not only mean a case in which orthogonal directions (normal directions) of two surfaces are aligned with each other, but also includes a case in which the orthogonal directions intersect with each other.

FIG. 1 is a perspective view which shows an interior of a vehicle 10.

As shown in FIG. 1, the lighting apparatus 1 of the present embodiment is mounted on, for example, a center console 11 of the vehicle 10. Note that directions of forward, rearward, left, right, and the like in the following description are the same as those in the vehicle described below, unless otherwise specified. In addition, an arrow FR indicating a front of the vehicle, an arrow LH indicating a left side of the vehicle, and an arrow UP indicating a top of the vehicle are shown in appropriate places in the drawings used in the following description.

<Center Console 11>

The center console 11 is disposed between a driver's seat 15 and a passenger seat 16, and is formed in a box shape extending in a forward and rearward direction. The center console 11 includes an exterior body 21, a frame (not shown), and a lighting apparatus 1.

An exterior body 21 constitutes an outer shell of the center console 11. A surface of the exterior body 21 constitutes a design surface exposed to a vehicle interior S. Specifically, the exterior body 21 includes a main panel 31 and a pair of side panels 32. The main panel 31 and the side panels 32 are each configured to have no light transmission properties (light shielding properties).

The main panel 31 mainly constitutes an upper surface of the design surface of the center console 11. Specifically, the main panel 31 extends in the forward and rearward direction with a vertical direction as a thickness direction. A through hole 31a allowing a shift lever 35 to protrude upward is formed in a front of the main panel 31.

Figure 2:
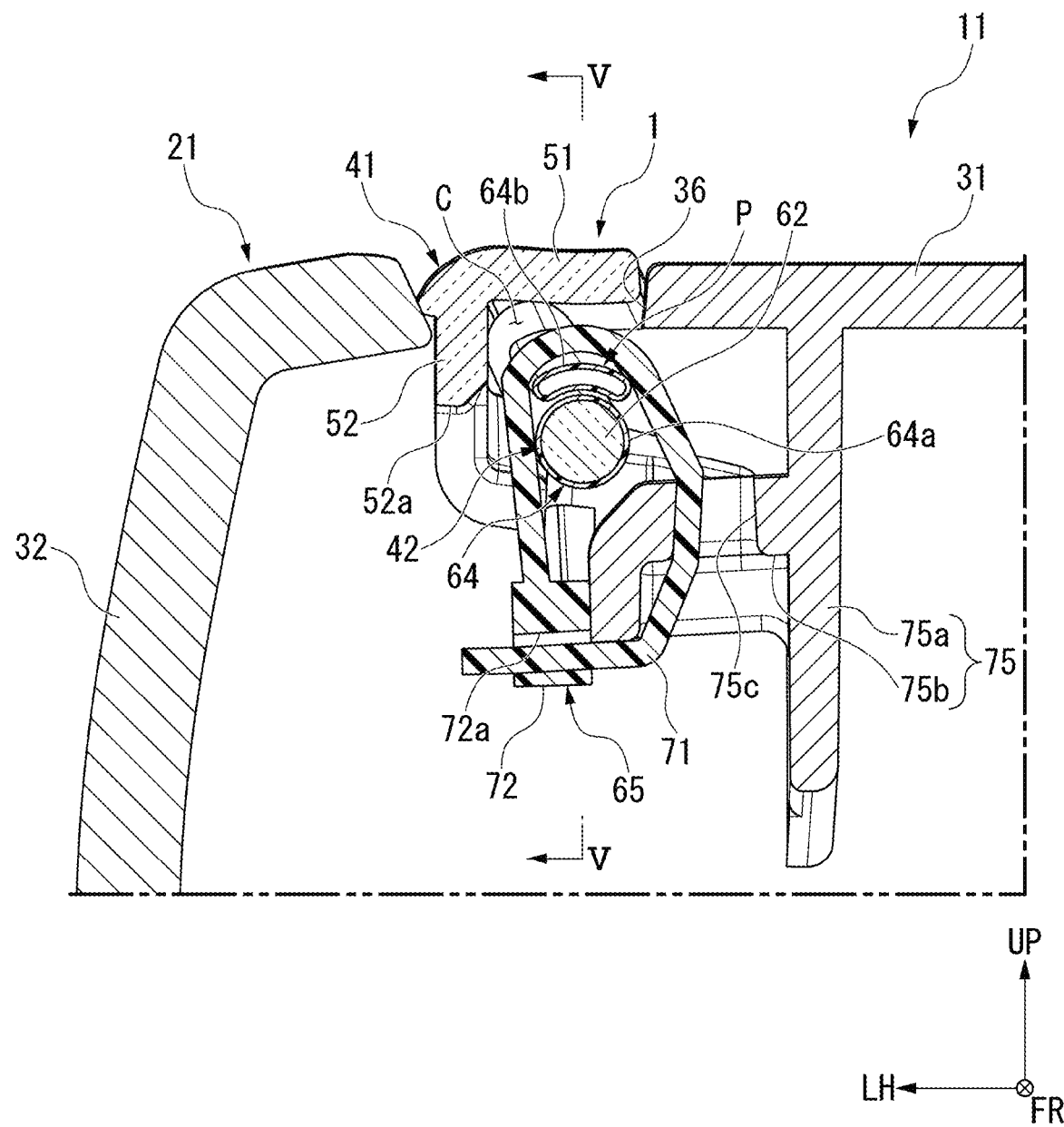
FIG. 2 is a cross-sectional view corresponding to a line II-II in FIG. 1.

FIG. 2 is a cross-sectional view corresponding to a line II-II in FIG. 1.

As shown in FIGS. 1 and 2, the pair of side panels 32 mainly constitute side surfaces of the design surface of the center console 11. The pair of side panels 32 are each disposed on an outer side of the main panel 31 in the vehicle width direction. The pair of side panels 32 extend in the forward and rearward direction along the side panels 32 with the vehicle width direction as the thickness direction. A groove 36 is formed between upper end edges of the side panels 32 and both left and right end edges of each side panel 32. The groove 36 extends in the forward and rearward direction along an outer periphery of an upper end of the center console 11 (ridges positioned on both sides in the vehicle width direction).

The frame is disposed inside the exterior body 21. The exterior body 21 is fixed to the frame by fastening members such as clips and screws. As a result, the frame supports the exterior body 21 from the inside.

<Lighting Apparatus 1>

The lighting apparatus 1 decorates the center console 11 by causing a part corresponding to the groove 36 (an upper outer periphery of the center console 11) to emit light in a linear shape. The lighting apparatus 1 includes a cover member 41 and a lighting unit 42. A similar lighting apparatus 1 is provided in each groove 36. Therefore, details of one lighting apparatus 1 will be described, and description of the other lighting apparatus 1 will be omitted in the following description.

The cover member 41 is attached to the exterior body 21 or the frame to fill the groove 36. The cover member 41 is made of a translucent or transparent material. In this case, it is preferable that the cover member 41 be formed while having light transmission properties to such an extent that an inside of the center console 11 cannot be seen through the cover member 41 (for example, being milky white or the like). Note that the cover member 41 may be colored and transparent, such as red or blue, so long as it has light transmission properties.

Figure 3:
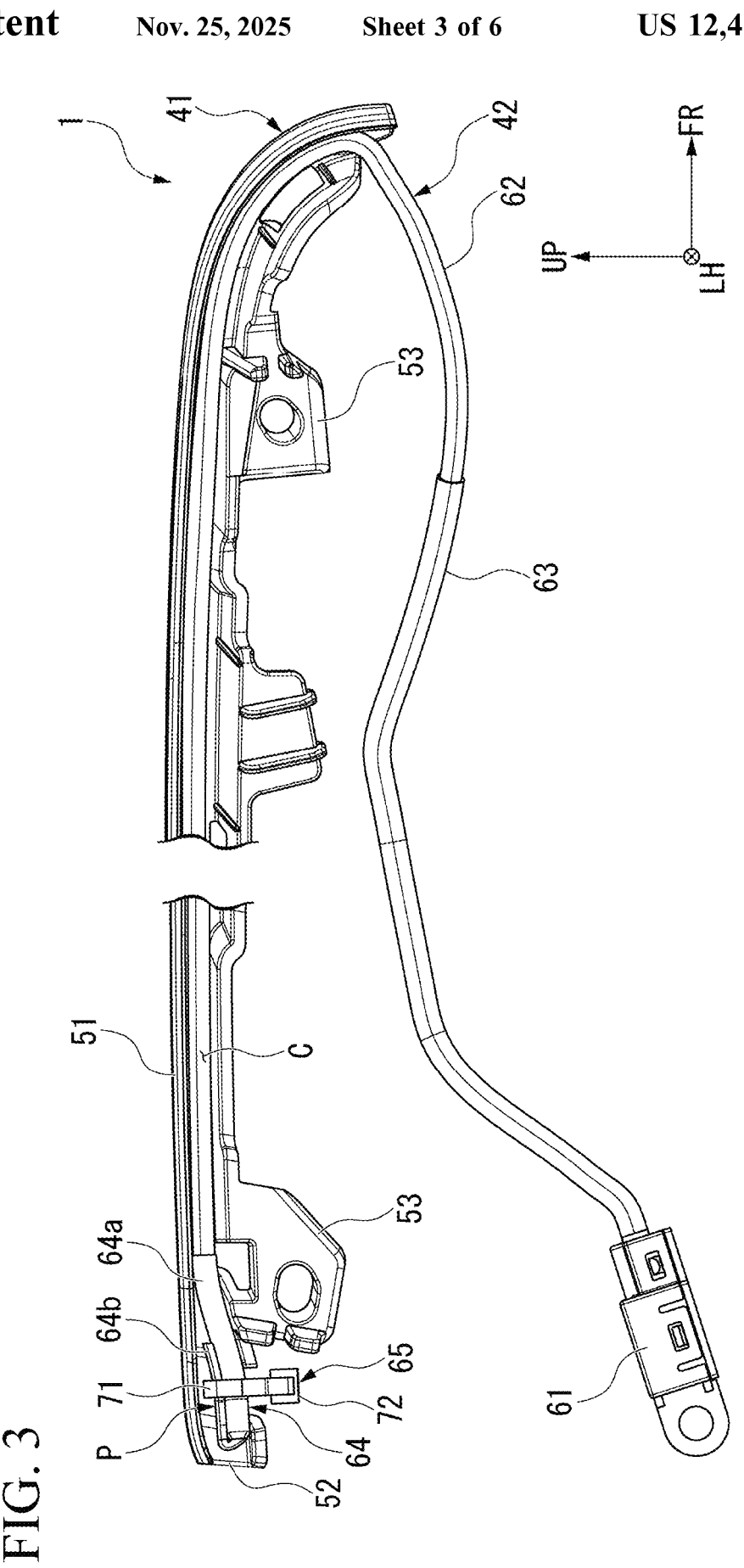
FIG. 3 is a side view of a lighting apparatus according to the embodiment.

FIG. 3 is a side view of the lighting apparatus 1.

As shown in FIGS. 2 and 3, the cover member 41 includes a transmission portion 51, a unit housing wall 52, and an attachment piece 53 (refer to FIG. 2).

The transmission portion 51, together with the exterior body 21, constitutes the design surface of the center console 11. The transmission portion 51 extends in the forward and rearward direction with the vertical direction as the thickness direction. The transmission portion 51 is provided to fill the groove 36. The cover member 41 is sufficient as long as at least the transmission portion 51 has the light transmission properties as described above.

The unit housing wall 52 is connected to an outer side edge of the transmission portion 51 in the vehicle width direction. The unit housing wall 52 is formed, for example, in an L-shape when viewed in the forward and rearward direction. In a cross-sectional view, the unit housing wall 52 extends downward from the outer side edge of the transmission portion 51 in the vehicle width direction, and then extends toward the inside in the vehicle width direction. Therefore, the unit housing wall 52 constitutes a housing space C in which the lighting unit 42 is held between the unit housing wall 52 and the transmission portion 51.

As shown in FIG. 3, the attachment piece 53 extends downward from the unit housing wall 52. The attachment piece 53 is attached to the exterior body 21 or the frame by a fastening member such as a screw or a clip.

The lighting unit 42 emits light toward an outside of the center console 11 (the vehicle interior S) through the transmission portion 51. Specifically, the lighting unit 42 includes a light source 61, a linear light guide body 62, a first light shielding tube 63, a second light shielding tube 64, and a holding member 65.

The light source 61 is, for example, an LED or a laser. The light source 61 is fixed to the exterior body 21 or the frame inside the exterior body 21.

The linear light guide body 62 is a wire, such as glass fiber, that has flexibility and can propagate light. The linear light guide body 62 propagates the light introduced into the inside in the extension direction of the linear light guide body 62, and emits a portion of the light from the outer circumferential surface during the process of propagating the light inside the linear light guide body 62. As the linear light guide body 62, a light pipe made of a resin material or the like may also be used.

A base end (a first side end) of the linear light guide body 62 is attached to the light source 61. That is, light emitted from the light source 61 is introduced into the linear light guide body 62 through a base end surface (first side end surface) of the linear light guide body 62. After being drawn out from the light source 61, the linear light guide body 62 is drawn around the housing space C in the forward and rearward direction over an entire length of the transmission portion 51.

The light shielding tubes 63 and 64 are attached to the linear light guide body 62 in a state where they surround the linear light guide body 62. The light shielding tubes 63 and 64 shield the light emitted from the linear light guide body 62. In other words, the light shielding tubes 63 and 64 have a function of limiting the emission range in the extension direction of the linear light guide body 62. As the light shielding tubes 63 and 64, so-called heat shrinking tubes that shrink in a radial direction when heated are preferably used. However, the light shielding tubes 63 and 64 may also shrink due to ultraviolet rays, or the like. In addition, the light shielding tubes 63 and 64, like a rubber material, may be configured to be attached to the linear light guide body 62 by a restoring force.

The first light shielding tube 63 is attached to a portion of the linear light guide body 62 that includes the base end. Specifically, the first light shielding tube 63 continuously covers a predetermined range of the linear light guide body 62 in the extension direction from a connection portion with the light source 61 in a portion of the linear light guide body 62 that is not housed in the housing space C. However, an attachment range of the first light shielding tube 63 can be changed as appropriate. In addition, the first light shielding tube 63 is not an essential component.

Figure 4:
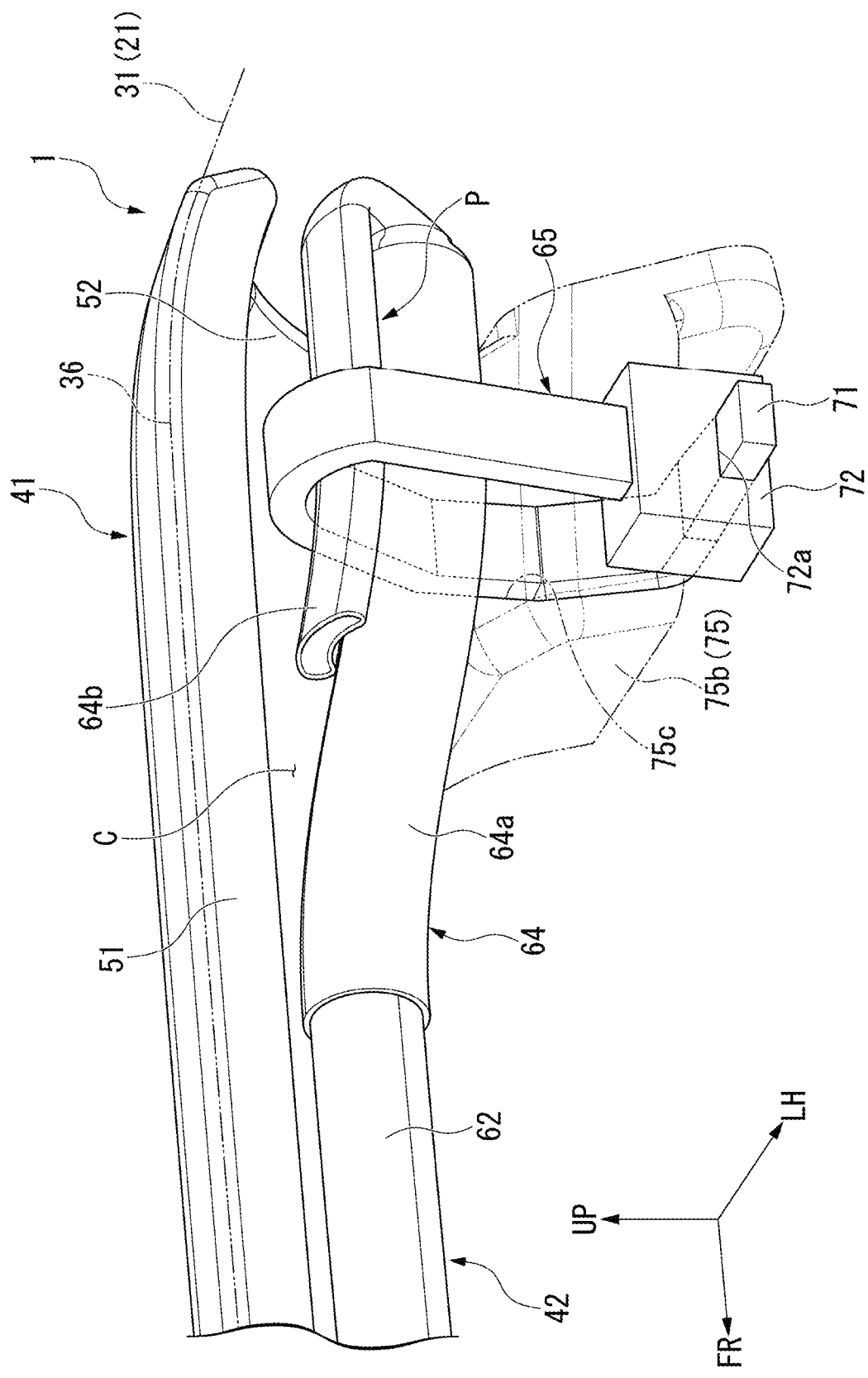
FIG. 4 is a perspective view which shows a periphery of a second light shielding tube according to the embodiment.
Figure 5:
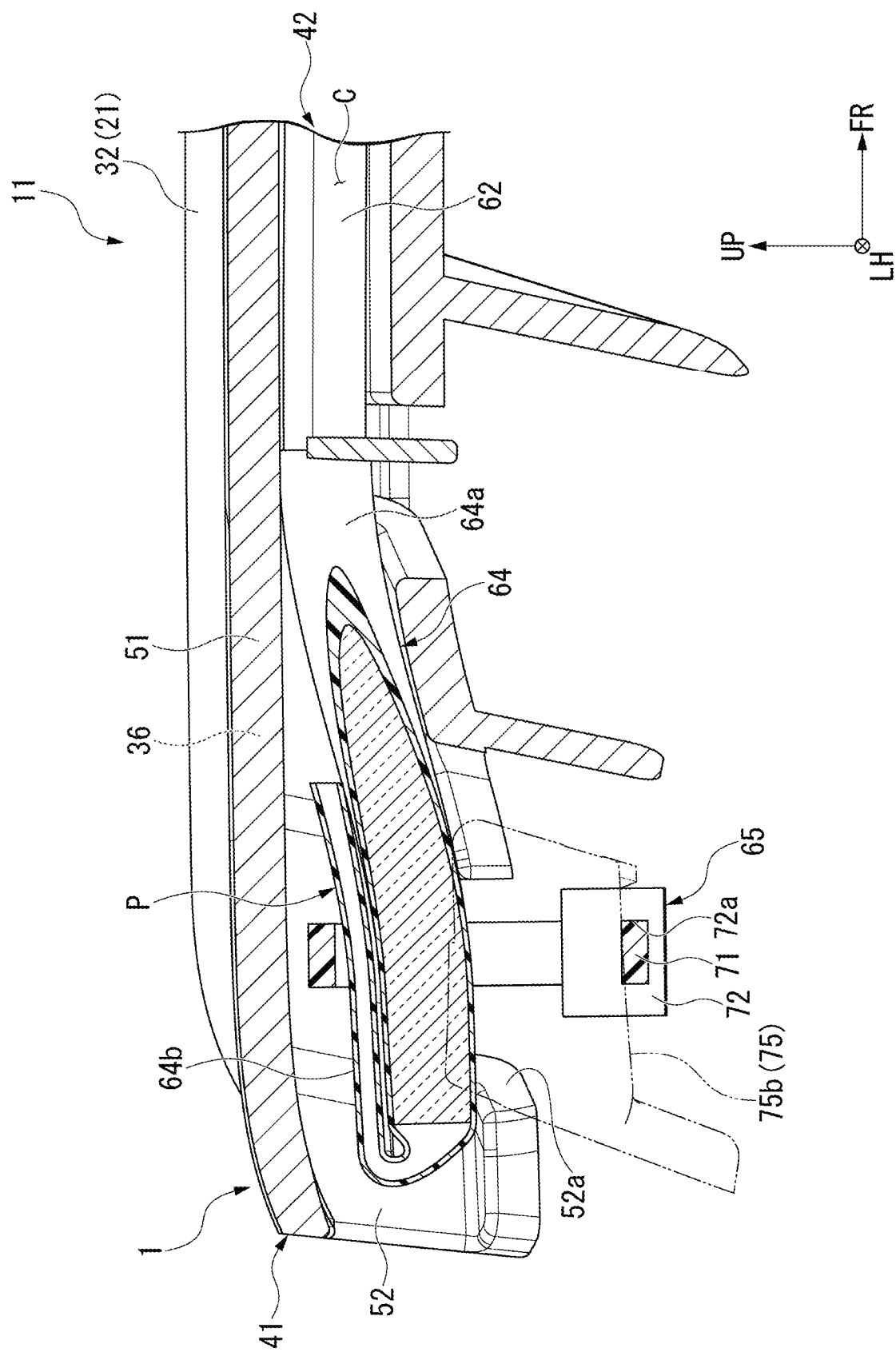
FIG. 5 is a cross-sectional view corresponding to a line V-V in FIG. 2.

FIG. 4 is a perspective view which shows a periphery of the second light shielding tube 64. FIG. 5 is a cross-sectional view corresponding to a line V-V in FIG. 2.

As shown in FIGS. 2, 4, and 5, the second light shielding tube (light shielding tube) 64 has a covering portion 64a and a protruding portion 64b.

The covering portion 64a is installed in a portion including a tip (a rear end) of the linear light guide body 62. Specifically, covering portion 64a continuously covers a predetermined range of the linear light guide body 62 in the extension direction from a tip surface of the linear light guide body 62. An inner peripheral surface of the covering portion 64a is in close contact with an entire outer circumferential surface of the linear light guide body 62.

The protruding portion 64b is integrally connected to the covering portion 64a and protruding from the tip (second side end) of the linear light guide body 62. The protruding portion 64b is bent to overlap the covering portion 64a. As a result, the protruding portion 64b is covering the tip surface of the linear light guide body 62. In the shown example, the protruding portion 64b is bent to overlap the covering portion 64a from above. In this case, the protruding portion 64b is disposed not to overlap a portion exposed from the covering portion 64a of the linear light guide body 62. An overlapping direction, a bending method, a length, and the like of the protruding portion 64b can be appropriately changed as long as the tip surface of the linear light guide body 62 is covered by the protruding portion 64b in a state in which the protruding portion 64b is bent. In addition, a position of the bent portion of the protruding portion 64b can be appropriately changed.

In the present embodiment, "bending" refers to a state in which the protruding portion 64b is deformed so that an extension direction of the protruding portion 64b intersects with an extension direction of the covering portion 64a. Therefore, in the present embodiment, the covering portion 64a is bent at 180° with respect to the protruding portion 64b. However, as long as the protruding portion 64b is configured to cover the tip surface of the linear light guide body 62, a bending angle of the protruding portion 64b with respect to the covering portion 64a (an angle between the extension directions of the covering portion 64a and the protruding portion 64b) can be changed as appropriate. In addition, the covering portion 64a may be bent in a manner other than folding in half (for example, zigzag folding, or the like).

The holding member 65 is a so-called binding band. Specifically, the holding member 65 includes a belt-like portion 71 and a locking portion 72.

The belt-like portion 71 is a long member having a rectangular shape in a cross-sectional view and has flexibility.

The locking portion 72 is integrally connected to a first side end of the belt-like portion 71. An insertion hole 72a is formed in the locking portion 72, which penetrates the locking portion 72.

The holding member 65 binds an overlapping portion P of the second light shielding tube 64, with the belt-like portion 71 wrapped around the overlapping portion P of the covering portion 64a and the protruding portion 64b, by inserting the belt-like portion 71 into the insertion hole 72a. Specifically, as shown in FIG. 2, a first through hole 52a which penetrates the unit housing wall 52 (another member) is formed at a position where the unit housing wall 52 overlaps with a binding portion of the holding member 65. In addition, a rib 75 that protruding toward an inside of the exterior body 21 is formed in the main panel 31. The rib 75 includes a vertical rib 75a that extends in the vertical direction and a transverse rib 75b that extends from the vertical rib 75a to an outer side in the vehicle width direction. A second through hole 75c that penetrates the transverse rib 75b is formed in the transverse rib (other member) 75b. The belt-like portion 71 is wound around the overlapping portion P through the first through hole 52a and the second through hole 75c. That is, the holding member 65 binds the lighting unit 42 together with the cover member 41 (the unit housing wall 52) and the exterior body 21 (the transverse rib 75b). In addition, a restricting portion (not shown) is formed in the insertion hole 72a, which allows the belt-like portion 71 to move in an insertion direction and restricts the belt-like portion 71 to move in a removal direction.

<Operation of Lighting Apparatus 1>

As shown in FIGS. 1 and 3, in the lighting apparatus 1, light emitted from the light source 61 is introduced into the linear light guide body 62 through the base end surface of the linear light guide body 62. The light introduced into the linear light guide body 62 propagates through the linear light guide body 62 toward the tip. A portion of the light propagating through the linear light guide body 62 is emitted from the outer circumferential surface of the linear light guide body 62 during the process of propagating through the linear light guide body 62. The light emitted from the outer circumferential surface of the linear light guide body 62 is emitted into the vehicle interior S through the transmission portion 51. As a result, the upper outer periphery of the center console 11 emits light in a linear shape, thereby decorating the center console 11.

In the lighting apparatus 1 of the present embodiment, a portion of the outer circumferential surface of the linear light guide body 62 is covered by the light shielding tubes 63 and 64. As a result, the light emission from the portion of the outer circumferential surface of the linear light guide body 62 covered by the light shielding tubes 63 and 64 is blocked. In addition, the tip surface of the linear light guide body 62 is covered by the protruding portion 64b of the second light shielding tube 64. For this reason, the light emission from the tip surface of the linear light guide body 62 is also blocked.

<Method of Assembling the Lighting Apparatus 1>

Figure 6:
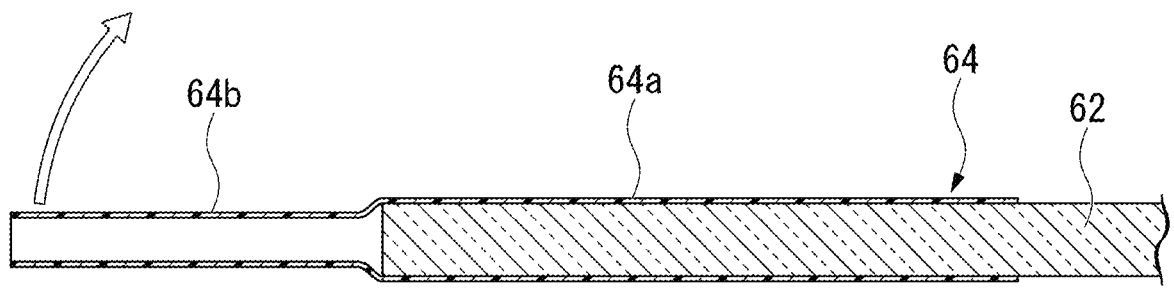
FIG. 6 is an enlarged cross-sectional view of a lighting unit in a state before bending.
Figure 6:
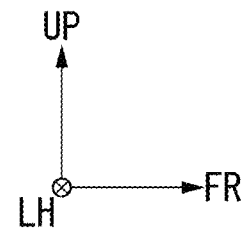

Next, a method of assembling the lighting apparatus 1 of the present embodiment will be described. In the following description, a method of assembling the second light shielding tube 64 and a method of assembling the lighting apparatus 1 when the lighting apparatus 1 is mounted as the center console 11 will be mainly described. FIG. 6 is an enlarged cross-sectional view of the lighting unit 42 before bending.

First, the second light shielding tube 64 is assembled to the tip of the linear light guide body 62. Specifically, as shown in FIG. 6, the tip of the linear light guide body 62 is inserted into a part of the second light shielding tube 64 (a portion corresponding to the covering portion 64a). In this state, the second light shielding tube 64 is heated. Then, the second light shielding tube 64 mainly shrinks inward in a radial direction. In this case, a portion of the second light shielding tube 64 into which the linear light guide body 62 is inserted is in close contact with the outer circumferential surface of the linear light guide body 62, and thus the shrinkage is restricted. On the other hand, the portion of the second light shielding tube 64 protruding from the linear light guide body 62 shrinks more than a portion into which the linear light guide body 62 is inserted. Therefore, a covering portion 64a that is in close contact with the outer circumferential surface of the linear light guide body 62, and a protruding portion 64b that is protruding from the linear light guide body 62 and has a smaller diameter than the covering portion 64a are formed in the second light shielding tube 64.

Next, as shown in FIGS. 3 and 6, the linear light guide body 62 is assembled to the cover member 41. Specifically, the linear light guide body 62 is drawn around the housing space C. Next, the protruding portion 64b of the second light shielding tube 64 is bent so that it overlaps the covering portion 64a (refer to an arrow in FIG. 6).

Then, the lighting apparatus 1 is fixed to the exterior body 21 or the frame so that the transmission portion 51 is exposed through the groove 36.

Then, with the belt-like portion 71 inserted into the first through hole 52a and the second through hole 75c, the overlapping portion P of the lighting unit 42 is bound together with the unit housing wall 52 and the transverse rib 75b by the holding member 65. As a result, with the tip surface of the linear light guide body 62 covered by the protruding portion 64b, the lighting apparatus 1 is assembled as the center console 11.

In this manner, the lighting apparatus 1 of the present embodiment has a base end (a first side end) into which the light from the light source 61 is introduced and a tip (a second side end) positioned on an opposite side to the base end, and includes the linear light guide body 62 in which the light introduced into the base end is propagated toward the tip to emit light in a linear shape, and a second light shielding tube (light shielding tube) 64 that has a covering portion 64a attached to the linear light guide body 62 to surround at least a periphery of the tip of the linear light guide body 62, and that is integrally connected to the covering portion 64a and has a protruding portion 64b protruding from the tip of the linear light guide body 62, and the protruding portion 64b is configured to be able to be bent with respect to the covering portion 64a.

With this configuration, by bending the protruding portion 64b of the second light shielding tube 64 with respect to the covering portion 64a, the tip surface (a second side end surface) of the linear light guide body 62 can be covered by the second light shielding tube 64. As a result, it is possible to prevent light from leaking from the tip surface of the linear light guide body 62. In this case, it is possible to reduce the number of parts and lower costs compared to a conventional configuration in which the tip surface of the linear light guide body 62 is covered by an end cap separate from the light shielding tube.

The lighting apparatus 1 of the present embodiment is configured to cover the linear light guide body 62 and to include a cover member 41 that can transmit the light emitted from the outer circumferential surface of the linear light guide body 62.

With this configuration, the light emitted from the outer circumferential surface of the linear light guide body 62 transmits through the cover member 41 (the transmission portion 51), and thereby a configuration can be made as if the surface of the cover member 41 is emitting light. In this case, a light-emitting surface can be formed in various shapes and layouts depending on a shape of the cover member 41.

The lighting apparatus 1 of the present embodiment is configured to include a holding member 65 that holds a bent state of the protruding portion 64b.

With this configuration, the bent state of the protruding portion 64b can be held so that it can withstand, for example, vibrations and changes over time. As a result, it is possible to provide a lighting apparatus 1 that is highly reliable over a long period of time.

In the lighting apparatus 1 of the present embodiment, the holding member 65 is configured to bind the second light shielding tube 64 together with other members (such as the unit housing wall 52 and the transverse rib 75b).

With this configuration, by binding the second light shielding tube 64 to other members with the holding member 65, the lighting apparatus 1 can be attached to other members without using a separate attachment member. As a result, it is possible to further reduce the number of parts and lower costs.

In the lighting apparatus 1 of the present embodiment, the second light shielding tube 64 is configured to be formed of a heat shrinking tube.

With this configuration, the second light shielding tube 64 is heated with the tip of the linear light guide body 62 inserted inside the second light shielding tube 64 before shrinkage. As a result, a portion of the second light shielding tube 64 into which the tip of the linear light guide body 62 is inserted can function as the covering portion 64a, and a portion protruding from the linear light guide body 62 can function as the protruding portion 64b. As a result, it is possible to easily realize the second light shielding tube 64 having the covering portion 64a and the protruding portion 64b. Moreover, a portion of the second light shielding tube 64 into which the linear light guide body 62 is not inserted (the protruding portion 64b) is likely to shrink with respect to the portion into which the linear light guide body 62 is inserted (the covering portion 64a). That is, in the second light shielding tube 64 after shrinkage, an outer diameter of the protruding portion 64b is likely to be smaller than an outer diameter of the covering portion 64a. For this reason, it is easy to determine a starting point of bending in the second light shielding tube 64, and thus a yield of the lighting apparatus 1 can be improved.

In the lighting apparatus 1 of the present embodiment, the linear light guide body 62 is made of glass fiber.

With this configuration, it is possible to allow the linear light guide body 62 to have flexibility. As a result, the lighting apparatus 1 can be adapted to various shapes and layouts.

(Other Modifications)

Although preferred embodiments of the present invention have been described above, the present invention is not limited to these embodiments. Addition, omission, substitution, and other modifications of the configuration are possible within a range not departing from the gist of the present invention. The present invention is not limited to the description described above, but is limited only by the scope of the attached claims. In the embodiment described above, it is described that the lighting apparatus 1 is mounted on the center console 11 of the vehicle 10, but the present invention is not limited to this configuration. The lighting apparatus 1 can be mounted on various interior panels of the vehicle 10, such as an instrument panel 100, a door panel, a meter panel, and the like. Furthermore, the lighting apparatus 1 may be mounted on something other than the vehicle 10.

In the embodiment described above, it is described that the lighting apparatus 1 is configured to include the cover member 41, but the present invention is not limited to this configuration. The cover member 41 is not an essential component.

In the embodiment described above, it is described that the holding member 65 is configured to bind the overlapping portion P together with other members, but the present invention is not limited to this configuration. The holding member 65 may be configured to bind only the overlapping portion P.

In the embodiment described above, it is described that the holding member 65 is configured using a binding band, but the present invention is not limited to this configuration. The holding member 65 may be a wire or clip, or may be adhesive, or the like. In addition, the overlapping portion P may be fitted into the cover member 41, or the like, thereby causing the cover member 41, or the like to function as a holding member.

For example, aspects of the present disclosure are as follows.

<1> A lighting apparatus includes a linear light guide body that has a first side end into which light from a light source is introduced and a second side end positioned opposite to the first side end, and emits light in a linear shape by propagating the light introduced into the first side end toward the second side end, and a light shielding tube that has a covering portion attached to the linear light guide body to surround at least the second side end of the linear light guide body and a protruding portion integrally connected to the covering portion and protruding from the second side end of the linear light guide body, in which the protruding portion is configured to be able to be bent with respect to the covering portion to cover a second side end surface of the linear light guide body.

<2>
The lighting apparatus according to <1>, further includes a cover member that covers the linear light guide body and is capable of transmitting light emitted from an outer circumferential surface of the linear light guide body.

<3>
The lighting apparatus according to <1> or <2>, further includes a holding member that holds a bent state of the protruding portion.

<4>
The lighting apparatus according to <3>, in which the holding member binds the light shielding tube together with other members.

<5>
The lighting apparatus according to any one of <1> to <4>, in which the light shielding tube is formed of a heat shrinking tube.

<6>
The lighting apparatus according to any one of <1> to <5>, in which the linear light guide body is made of glass fiber.

In addition, components in the embodiment described above may be replaced with well-known components as appropriate within a range not departing from the gist of the present invention, and the modified examples described above may be combined as appropriate.

BRIEF DESCRIPTION OF THE REFERENCE SYMBOLS

1 Lighting apparatus
41 Cover member
61 Light source
62 Linear light guide body
64 Second light shielding tube (light shielding tube)
64*a* Covering portion
64*b* Protruding portion
65 Holding member

What is claimed is:

1. A lighting apparatus comprising:
a linear light guide body that has a first side end into which light from a light source is introduced and a second side end positioned opposite to the first side end, and emits light in a linear shape by propagating the light introduced into the first side end toward the second side end; and
a light shielding tube that has a covering portion attached to the linear light guide body to surround at least the second side end of the linear light guide body and a protruding portion integrally connected to the covering portion and protruding from the second side end of the linear light guide body,
wherein the protruding portion is configured to be able to be bent with respect to the covering portion to cover a second side end surface of the linear light guide body.

2. The lighting apparatus according to claim 1, further comprising:
a cover member that covers the linear light guide body and is capable of transmitting light emitted from an outer circumferential surface of the linear light guide body.

3. The lighting apparatus according to claim 2, further comprising:
a holding member that holds a bent state of the protruding portion.

4. The lighting apparatus according to claim 3,
wherein the holding member binds the light shielding tube together with other members.

5. The lighting apparatus according to claim 2,
wherein the light shielding tube is formed from a heat shrinking tube.

6. The lighting apparatus according to claim 2,
wherein the linear light guide body is made of glass fiber.

7. The lighting apparatus according to claim 1, further comprising:
a holding member that holds a bent state of the protruding portion.

8. The lighting apparatus according to claim 7,
wherein the holding member binds the light shielding tube together with other members.

9. The lighting apparatus according to claim 1,
wherein the light shielding tube is formed from a heat shrinking tube.

10. The lighting apparatus according to claim 1,
wherein the linear light guide body is made of glass fiber.

* * * * *